(12) United States Patent
Perumalla et al.

(10) Patent No.: US 12,202,373 B2
(45) Date of Patent: Jan. 21, 2025

(54) DETACHABLE POWERTRAIN CONTROL IN AUTONOMOUS VEHICLES DURING COLLABORATIVE MOVEMENT

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Sirisha Akella, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 17/655,557

(22) Filed: Mar. 21, 2022

(65) Prior Publication Data
US 2023/0294547 A1    Sep. 21, 2023

(51) Int. Cl.
*B60L 53/80*    (2019.01)
*B62D 47/00*    (2006.01)
*B60L 53/57*    (2019.01)
*G05D 1/00*    (2006.01)

(52) U.S. Cl.
CPC ............ *B60L 53/80* (2019.02); *B62D 47/006* (2013.01); *B60L 53/57* (2019.02); *G05D 1/0011* (2013.01)

(58) Field of Classification Search
CPC ....... B60L 53/80; B60L 53/57; B62D 47/006; G05D 1/0011; G06Q 10/0833
See application file for complete search history.

(56) References Cited

U.S. PATENT DOCUMENTS

| | | | |
|---|---|---|---|
| 2018/0022405 A1 | 1/2018 | Gecchelin | |
| 2018/0348792 A1 | 12/2018 | O'Brien | |
| 2019/0049952 A1* | 2/2019 | Miller | G05D 1/0055 |
| 2020/0079351 A1* | 3/2020 | Li | B60W 20/13 |
| 2022/0289066 A1* | 9/2022 | Kim | B60L 53/80 |

FOREIGN PATENT DOCUMENTS

| | | | | |
|---|---|---|---|---|
| CN | 111976455 A | | 11/2020 | |
| CN | 113469301 A | * | 10/2021 | |
| WO | 2020222370 A1 | | 11/2020 | |
| WO | WO-2021035298 A1 | * | 3/2021 | B60L 50/66 |
| WO | 2023179979 A1 | | 9/2023 | |

OTHER PUBLICATIONS

CN-113469301-A English translation (Year: 2024).*
(Continued)

*Primary Examiner* — Jelani A Smith
*Assistant Examiner* — Paul A Castro
(74) *Attorney, Agent, or Firm* — Robert R. Aragona (57) ABSTRACT

The present invention may include a processor that coupling vehicles into a linked vehicle, where each vehicle has a powertrain device with an attachment device, where the attachment device detaches the powertrain device from one of the vehicles. The processor causes the attachment device to detach the powertrain device from at least one of the vehicles based on determining that a weight of the linked vehicle should be reduced.

17 Claims, 7 Drawing Sheets

(56) References Cited

OTHER PUBLICATIONS

International Searching Authority, "Notification of Transmittal of the International Search Report and the Written Opinion of the International Searching Authority, or Declaration," Patent Cooperation Treaty, May 24, 2023, 12 pages, International Application No. PCT/E P2023/053860.

Wikipedia, "k-means clustering", Wikipedia, the free encyclopedia, [accessed on May 24, 2023], 17 Pages, Retrieved from the Internet: <URL: https://en.wikipedia.org/w/index.php?title=K-means_clustering&soldid=1045476197>.

Mell et al., "The NIST Definition of Cloud Computing", National Institute of Standards and Technology, Special Publication 800-145, Sep. 2011, 7 pages.

* cited by examiner

DETACHABLE POWERTRAIN CONTROL IN AUTONOMOUS VEHICLES DURING COLLABORATIVE MOVEMENT

BACKGROUND

The present invention relates, generally, to the field of computing, and more particularly to detachable vehicle powertrains.

A powertrain is a group of components within a motor vehicle that delivers power to the drive wheels that includes both the engine and the drivetrain. In electrical vehicles, the powertrain may incorporate the power source, such as batteries or hydrogen power cells, as an integral part of the vehicle.

The weight of a motor vehicle typically consists of a combination of self-weight and a vehicle payload. The self-weight of the vehicle is typically the weight of the parts that are used to assemble the vehicle without any load. The payload is typically the maximum weight designed to be carried by the vehicle. Thus, the powertrain is designed to run the self-weight and the payload of the vehicle.

SUMMARY

According to one embodiment, a method, computer system, and computer program product for detachable powertrain control is provided. The present invention may include a processor that coupling vehicles into a linked vehicle, where each vehicle has a powertrain device with an attachment device, where the attachment device detaches the powertrain device from one of the vehicles. The processor causes the attachment device to detach the powertrain device from at least one of the vehicles based on determining that a weight of the linked vehicle should be reduced.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to detachable powertrain control during collaborative movement of vehicles. The following described exemplary embodiments provide a system, method, and program product to, among other things, determine an optimal powertrain for a linked vehicle and remove powertrains from one or more vehicles in the linked vehicle in order to reduce the self-weight and thus increasing the payload. Therefore, the present embodiment has the capacity to improve the technical field of detachable vehicle powertrains by enabling computerized detachment of unnecessary powertrains from one or more vehicles to decrease the payload of the linked vehicle. As discussed below, linked vehicle is a plurality of vehicles that are coupled together using mechanical or magnetic means, such as using a hook or an electrical magnet.

As previously described, motor vehicle weight typically includes a combination of self-weight and a payload. The self-weight of the vehicle is typically the weight of the parts that used to assemble the vehicle without any load. The payload is typically the maximum weight designed to be carried by the vehicle. Thus, the powertrain is design to run the self-weight and the payload of the vehicle.

In a modern city, there is a need for optimizing transportation both for public and goods deliveries. As more electrical and self-driving vehicles are designed, an optimization of transportation, such as interconnection of multiple vehicles to create a train of vehicles, may be used to optimize the transportation needs and reduce traffic.

Coupling of multiple vehicles into a linked vehicle has an advantage because it optimizes the power usage and reduces driver labor, such as by using less gas or electricity. Nevertheless, the vehicle self-weight may still affect an overall efficiency of the linked vehicle configuration because the operating powertrain requires significant energy to pull the weight of the coupled vehicles as cars of a train. As such, it may be advantageous to, among other things, implement a system that identifies a location where the linked vehicle is assembled and a location where the linked vehicle is disassembled and based on optimal powertrain requirements, remove the unnecessary powertrains at the assembly location and assemble it back at the disassembly location.

According to one embodiment, a system may identify a start and an end of the road where the linked vehicle is planned to pass in order to determine an optimal location for powertrain detachment. Then the system may determine optimal powertrain requirements based on historical usage data at the same route. When the optimal powertrain requirements are determined, the system may control the detachment mechanism of a removable powertrain to detach one or more powertrains at the start, and reattach the powertrains at the end, of a traversed roadway without human intervention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine optimal powertrain requirements for a plurality of linked vehicle attached as a linked vehicle and detach and reattach the powertrains based on the estimated load and required power needs of the linked vehicle.

Figure 1:
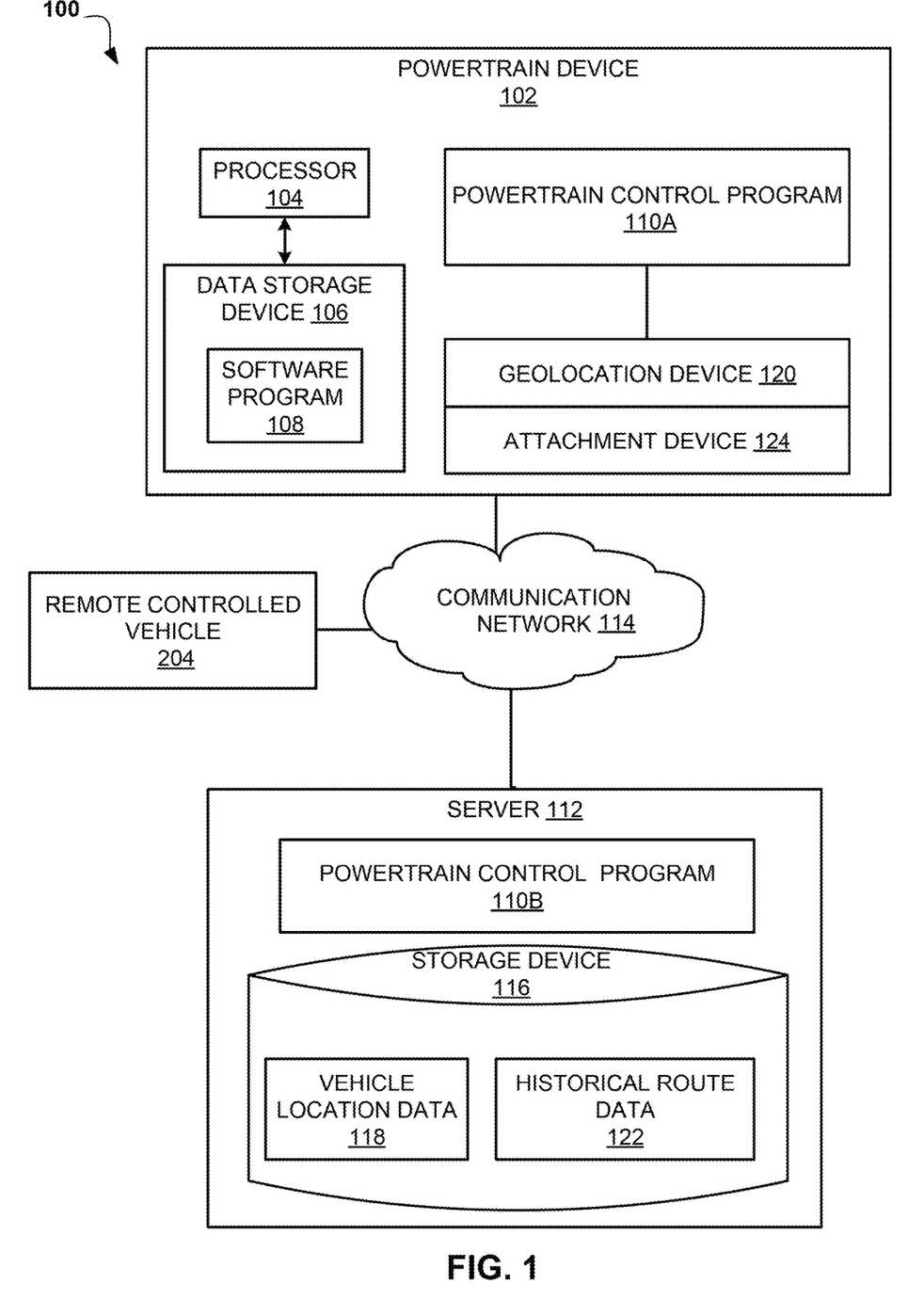
FIG. 1 illustrates an exemplary networked computer environment according to at least one embodiment.

Referring to FIG. 1, an exemplary networked computer environment 100 is depicted, according to at least one embodiment. The networked computer environment 100 may include powertrain device 102, a remote controlled vehicle 204 and a server 112 interconnected via a communication network 114. According to at least one implementation, the networked computer environment 100 may include a plurality of powertrain devices 102, remote controlled vehicles 204 and servers 112, of which only one of each is shown for illustrative brevity. According to an example embodiment, the remote controlled vehicle 204 may have the same components as the powertrain device 102 described below.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Figure 2:
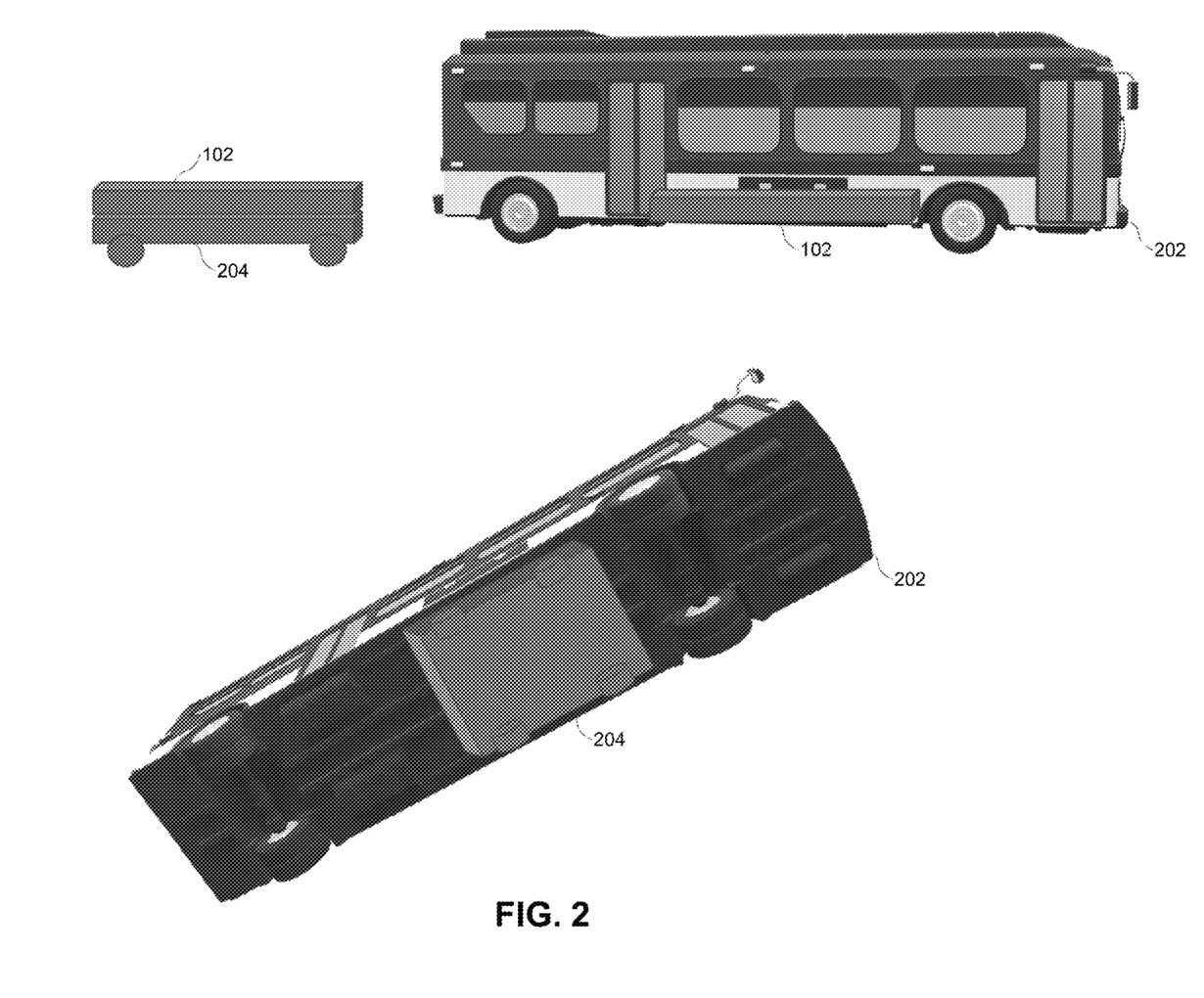
FIG. 2 is a block diagram of powertrain device attachment to a vehicle according to at least one embodiment.

Powertrain device 102 may be a part of the vehicle, such as an autonomous vehicle, that may attach or detach itself to the vehicle (see FIG. 2). According to an example embodiment, powertrain device 102 may incorporate a computing device, an engine and transmission when the powertrain is gas powered or an engine coupled with a battery when the powertrain is electrical. Furthermore, powertrain device 102 may include a processor 104 and a data storage device 106 that is enabled to host and run a software program 108 and a powertrain control program 110A connected to a geolocation device 120 and an attachment device 124 and configured to communicate with the server 112 via the communication network 114, in accordance with one embodiment of the invention. Powertrain device 102 may incorporate, for example, a mobile device, a netbook, a laptop computer, a tablet computer, a desktop computer, or any type of computing device capable of running a program and accessing a network. Although not depicted, powertrain device 102 may incorporate a weight sensor in order to determine a payload weight of the vehicle to which it is attached. As will be discussed with reference to FIG. 5, the powertrain device 102 may include internal components 502a and external components 504a, respectively. According to an example embodiment, geolocation device 120 may be any device capable of identifying a geographic location of the powertrain device 102 such as Global Positioning System (GPS), Global Navigation Satellite System (GLONASS), or Starlink-based location services. The attachment device 124 may be any hydraulic, pneumatic, electro-mechanical or magnetic device that enables attachment of the powertrain device 102 to vehicle 202 (see FIG. 2).

The server computer 112 may be a laptop computer, netbook computer, personal computer (PC), a desktop computer, or any programmable electronic device or any network of programmable electronic devices capable of hosting and running a powertrain control program 110B and a storage device 116 and communicating with the powertrain device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The storage device may store vehicle location data 118 and historical route data 122 databases. Vehicle location data 118 may be a database that stores all the routes each of the vehicles performed in the past including the current route. Historical route data 122 may include data related to a number of vehicles on each route, the payload of each vehicle during each road and weight distribution between the vehicles when arranged in a linked vehicle configuration.

Referring now to FIG. 2, a block diagram of powertrain device attachment to a vehicle is depicted, according to at least one embodiment. A vehicle 202 that may be either autonomous or human-controlled may be configured to receive a powertrain device 102 using a remote controlled vehicle 204. According to an example embodiment, the remote controlled vehicle 204 may be configured to be relocated to a geolocation where the powertrain device 102 is attached or detached to the vehicle 202. In another embodiment, the powertrain device 102 may be coupled with the remote controlled vehicle 204 as depicted in mobile powertrain device 204. According to an example embodiment, remote controlled vehicle 204 or mobile powertrain device 204 may identify and relocate itself to a location of vehicle 202 and, using the attachment device 124 (not depicted), attach the powertrain to the vehicle 202. In another embodiment, the remote controlled vehicle 204 may be a simple lift that is stationary on one of the stops of vehicle 202 and configured to lift powertrain device 102 to attach it to vehicle 102. In further embodiments, when the powertrain device 102 is an electrical engine coupled with a battery, the remote controlled vehicle 204 may charge the battery of the powertrain device 102.

Figure 3:
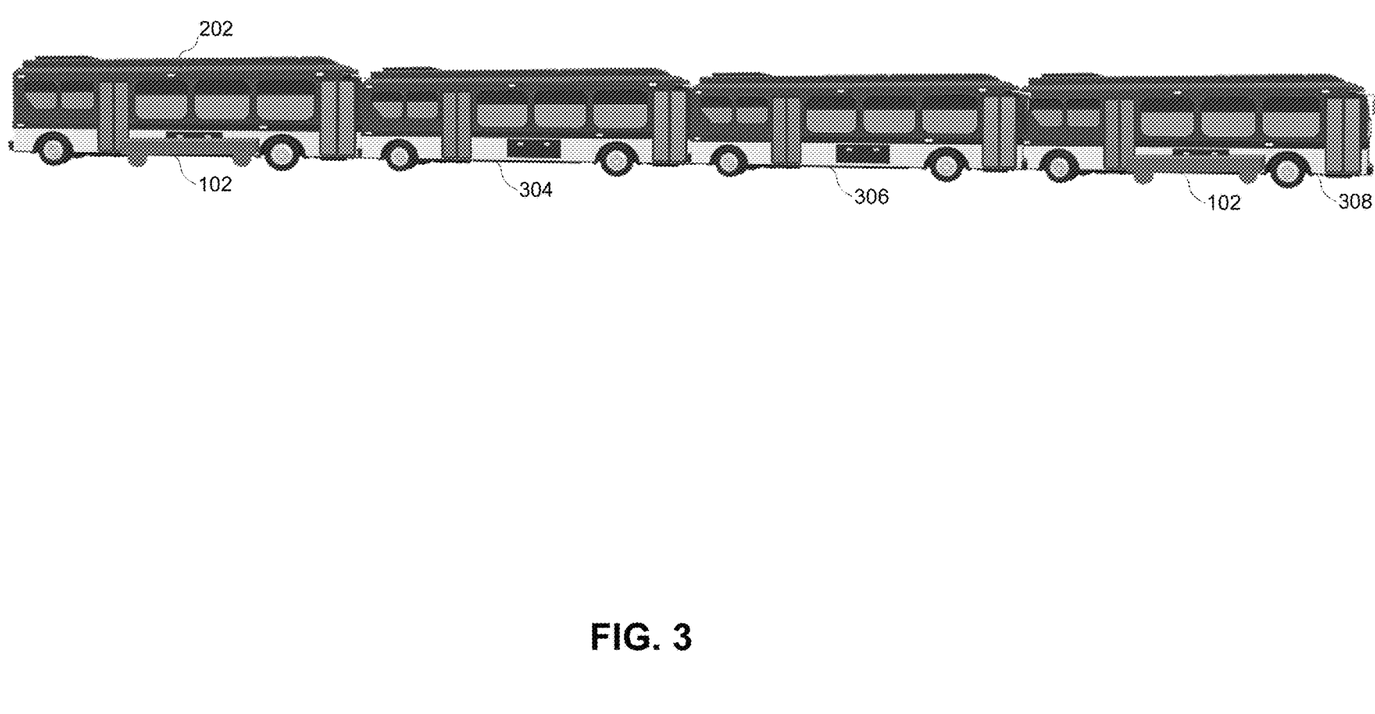
FIG. 3 is a block diagram depicting optimized powertrain of linked vehicle from multiple vehicles according to at least one embodiment.

Referring now to FIG. 3, a block diagram of an optimized powertrain of the linked vehicle is depicted, according to at least one embodiment. According to an example embodiment, when four vehicles are chained in a linked vehicle, in order to increase payload and optimize power, several powertrains may be removed from the vehicles. For example, vehicle 304 and vehicle 306 had their powertrain devices 102 removed thus decreasing the weights of vehicle 304 and vehicle 306. Vehicle 202 has its powertrain device 102 reattached, thus vehicle 202 may decouple from the linked vehicle and take an independent route, while vehicle 308 may continue in a linked vehicle formation and tow vehicle 304 and vehicle 306 with installed powertrain device 102. According to an example embodiment, the vehicles 202, 304, 306 308 may be autonomous vehicles, however the same, or a similar, approach may be utilized by internal combustion powertrains and adopted to human driven vehicles. The control of the coupling of vehicles into linked vehicles and powertrain device removal and insertion is described below.

According to the present embodiment, the powertrain control program 110A, 110B may be a program capable of determining when coupling of vehicles is desired, estimating the optimal number of power devices required for the linked vehicle after coupling, and managing detachment and reattachment of powertrain devices based on the rout. The powertrain control method is explained in further detail below with respect to FIG. 4.

Figure 4:
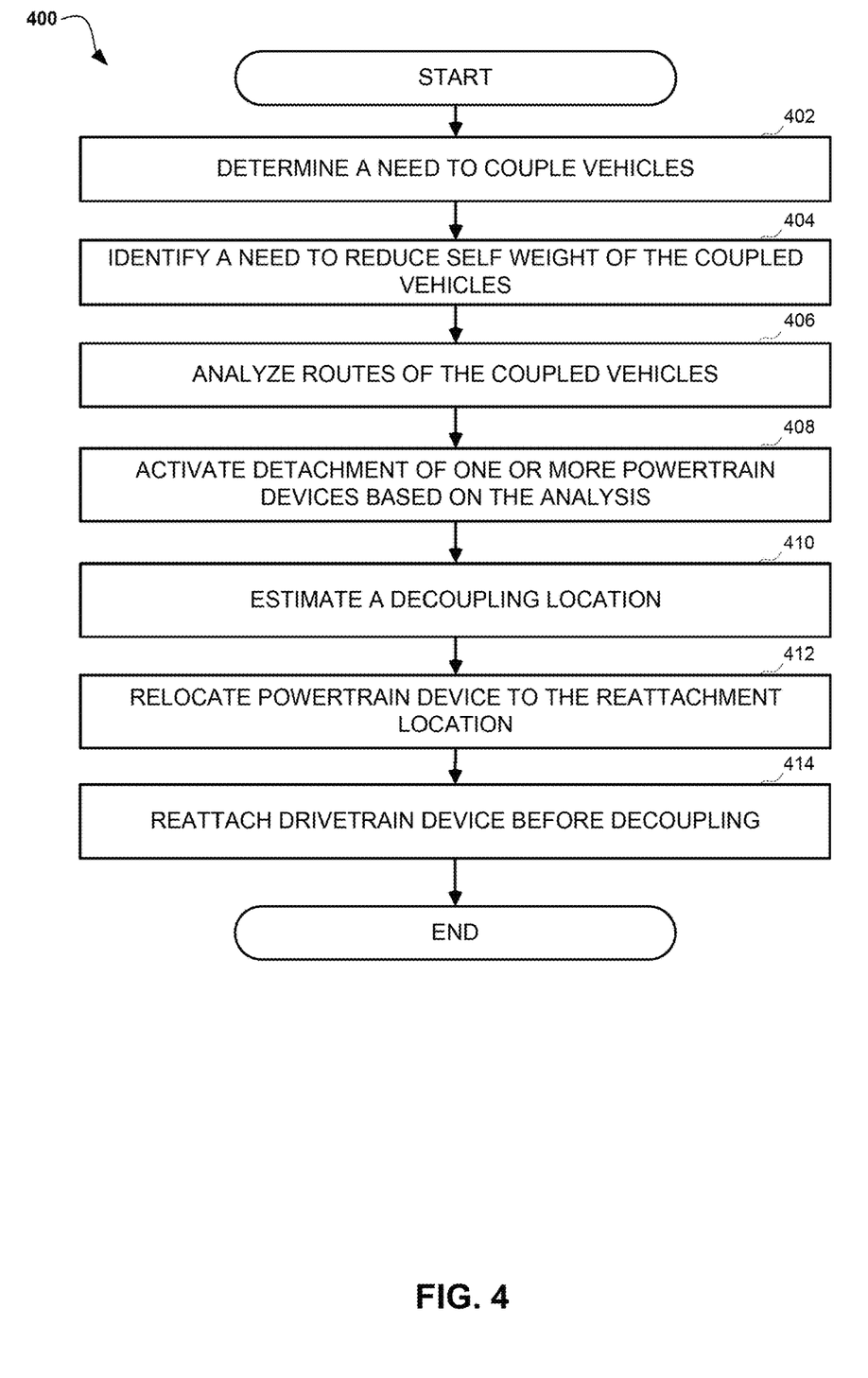
FIG. 4 is an operational flowchart illustrating a powertrain management process according to at least one embodiment.

Referring now to FIG. 4, an operational flowchart illustrating a powertrain management process 400 is depicted according to at least one embodiment. At 402, the powertrain control program 110A, 110B determines a need to couple vehicles. According to an example embodiment, the powertrain control program 110A, 110B may analyze historical route data 122 to determine when more than one vehicle is taking the same route at similar timeframes. For example, the powertrain control program 110A, 110B may use a K means clustering algorithm to identify similar routes during a specific timeframe. Then, the powertrain control program 110A, 110B may set a route with locations where one or more vehicles may be coupled and decoupled. In another embodiment, the powertrain control program 110A, 110B may estimate a trend in payload and based on the payload satisfying a preconfigured threshold, increase the linked vehicle capacity by coupling additional vehicles into the linked vehicle configuration. For example, when the linked vehicle is a public transportation vehicle and the payload are the people, the powertrain control program 110A, 110B may add an additional vehicle when the weight (payload) of vehicles reaches above 80% of maximum payload of the linked vehicle.

Next, at 404, the powertrain control program 110A, 110B identifies a need to reduce self-weight of the coupled vehicles. According to an example embodiment, the powertrain control program 110A, 110B may analyze the payload of the linked vehicle, such as by using a weighting device of the powertrain device 102 and determine an optimal weight and associated power required for the optimal running of the linked vehicle. For example, the powertrain control program 110A, 110B may identify whether only one power train is enough to power the linked vehicle by estimating the weight of the linked vehicle based on historical payload values. If the linked vehicle's overall weight is above a preconfigured range of the capabilities of a single powertrain device, the powertrain control program 110A, 110B may estimate a weight of the linked vehicle without one or more powertrains until the power of the powertrain device is within the range to operate the linked vehicle. In another embodiment, the powertrain control program 110A, 110B may use historical data to identify a payload and set a number of powertrains based on historical data of the payload on the route. In another embodiment, the powertrain control program 110A, 110B may utilize a digital twin simulation model of the linked vehicle to identify the optimal power that is required to operate the linked vehicle and, based on the available powertrain devices outputs, determine whether one or more powertrain devices are required to operate the linked vehicle.

Then, at 406, the powertrain control program 110A, 110B analyzes a route of coupled vehicles. According to an example embodiment, the powertrain control program 110A, 110B may analyze the route to identify optimal locations where the powertrain devices may be detached from the linked vehicles. For example, if the vehicle is an electric bus, the detachment of the powertrain device may be at one or more bus stops that, for example, enable not just detachment of powertrains but also charging of the batteries while the powertrain device is detached from the linked vehicle. In another embodiment, the optimal location may be a geolocation where at least one of the vehicles of the linked vehicle needs to be decoupled.

Next, at 408, the powertrain control program 110A, 110B activates detachment of one or more powertrain devices based on the analysis. According to an example embodiment, the powertrain control program 110A, 110B may determine that one of the optimal locations for detachment is reached by the linked vehicle based on geolocation data received from the geolocation device 120 and activates detachment of the powertrain device. According to an example embodiment, the detachment may include controlling the remote controlled vehicle 204 to relocate to the geolocation of the powertrain device 102 and activating the attachment device 124 to detach the powertrain 102 from vehicle 202. As previously mentioned, the attachment device 124 may be an electrical motor or a hydraulic component that lowers the powertrain device 102 to the remote controlled vehicle 204. In another embodiment where the remote controlled vehicle is incorporated into the powertrain device 102, the attachment device 124 may lower the power train device until it reaches the ground.

Then, at 410, the powertrain control program 110A, 110B estimates a decoupling location. According to an example embodiment, the powertrain control program 110A, 110B may identify an optimal location based on the route of the linked vehicle and the estimated decoupling of a vehicle that needs the reattachment of the powertrain device to move independently. For example, the estimated decoupling location may be a charging station on the route of the linked vehicle where the powertrain devices may be serviced or charged. In another embodiment, the decoupling location may be due to low level of battery charge if the powertrain device is battery operated. For example, when the battery charge reaches 5% of its full capacity, a decoupling location may be used to detach an existing powertrain device with discharged battery with a charged powertrain device.

Next, at 412, the powertrain control program 110A, 110B relocates powertrain device 102 to the reattachment location. According to an example embodiment, the powertrain control program 110A, 110B may assign a geolocation on a route where the linked vehicle may stop and, using the remote controlled vehicle 204, relocate the powertrain device 102 to the estimated stop to load the powertrain device on vehicle 202. For example, when the linked vehicle is used as a public transport and the last vehicle needs to take another route at the intersection, the powertrain device may be relocated to a bus stop before the intersection in order to reattach to the last vehicle and enable decoupling of the last vehicle from the linked vehicle at the intersection. Both before and after the decoupling process, the vehicle and the linked vehicle abide all traffic regulations and safety procedures, such as speed limits and yielding to pedestrians. In another embodiment, the last vehicle in the linked vehicle may be used for decoupling, thus the powertrain device should be relocated to the location where the last vehicle would stop before reattachment of the powertrain device. In a further embodiment, when the powertrain device 102 is combined with the remote controlled vehicle 204, the powertrain device may relocate itself to the reattachment location. In another embodiment, the powertrain control program 110A, 110B may return to step 402 in order to reevaluate the requirements of the linked vehicle and the associated power after the decoupling.

Then, at 414, the powertrain control program 110A, 110B reattaches powertrain 102 device before decoupling. According to an example embodiment, the powertrain control program 110A, 110B may identify that the linked vehicle reached the geolocation using geolocation device 120 and instruct the remote controlled vehicle 204 to reattach the powertrain device 102 to the vehicle, such as vehicle 202. The exact location may be identified using triangulation techniques such as by utilizing ultra-wideband, radio frequency or Bluetooth technologies.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
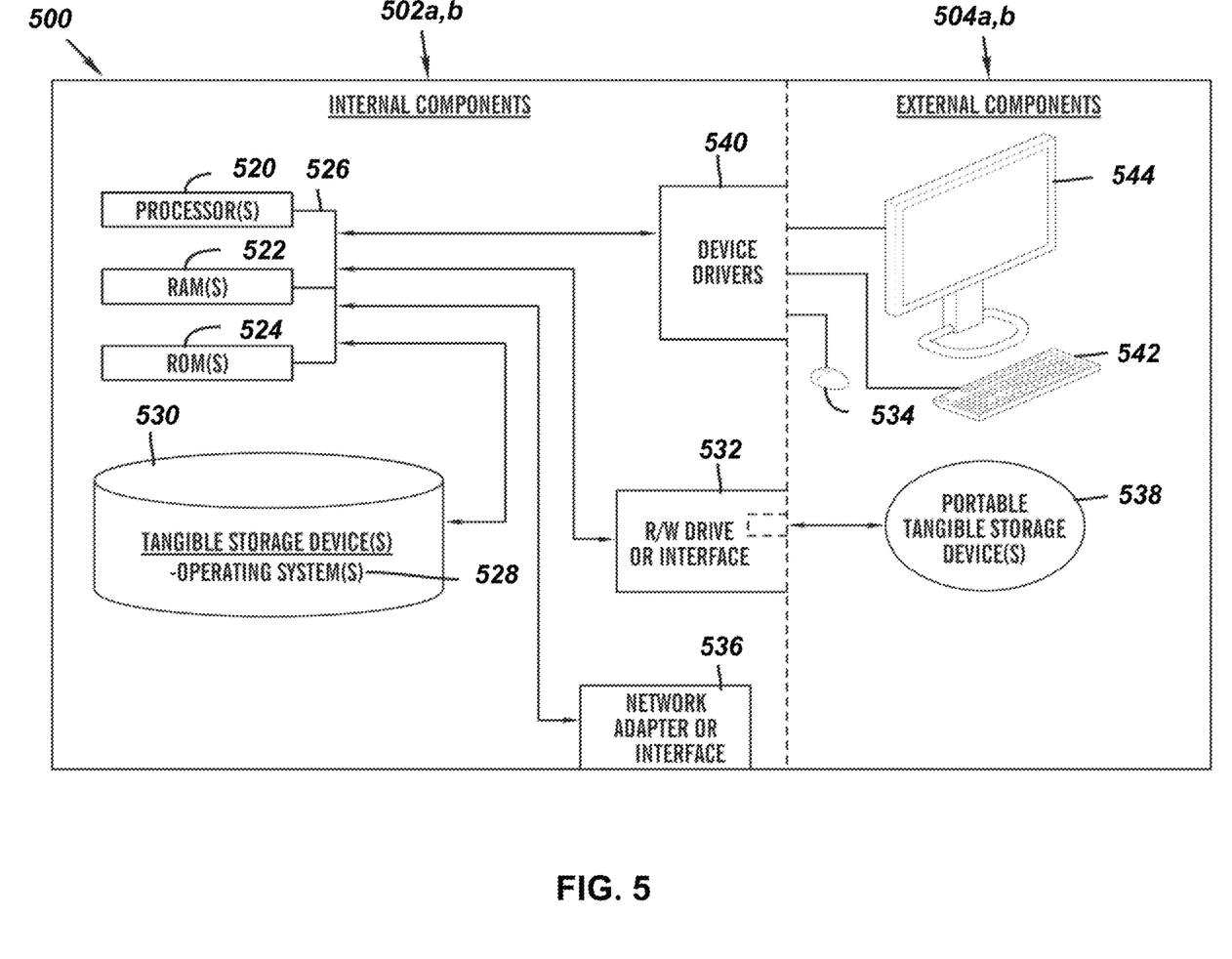
FIG. 5 is a block diagram of internal and external components of computers and servers depicted in FIG. 1 according to at least one embodiment.

FIG. 5 is a block diagram 500 of internal and external components of the powertrain device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The powertrain device 102 and the server 112 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 330. The one or more operating systems 528, the software program 108 and the powertrain control program 110A in the powertrain device 102, and the powertrain control program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a RAY drive or interface 532 to read from and write to one or more portable computer-readable tangible storage devices 538 such as a CD-ROM, DVD, memory stick, magnetic tape, magnetic disk, optical disk or semiconductor storage device. A software program, such as the powertrain control program 110A, 110B, can be stored on one or more of the respective portable computer-readable tangible storage devices 538, read via the respective RAY drive or interface 532, and loaded into the respective hard drive 530.

Each set of internal components 502a,b also includes network adapters or interfaces 536 such as a TCP/IP adapter cards, wireless Wi-Fi interface cards, or 3G, 4G, or 5G wireless interface cards, Bluetooth interface cards or other wired or wireless communication links. The software program 108 and the powertrain control program 110A in the powertrain device 102 and the powertrain control program 110B in the server 112 can be downloaded to the powertrain device 102 and the server 112 from an external computer via a network (for example, the Internet, a local area network or other, wide area network) and respective network adapters or interfaces 536. From the network adapters or interfaces 536, the software program 108 and the powertrain control program 110A in the powertrain device 102 and the powertrain control program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
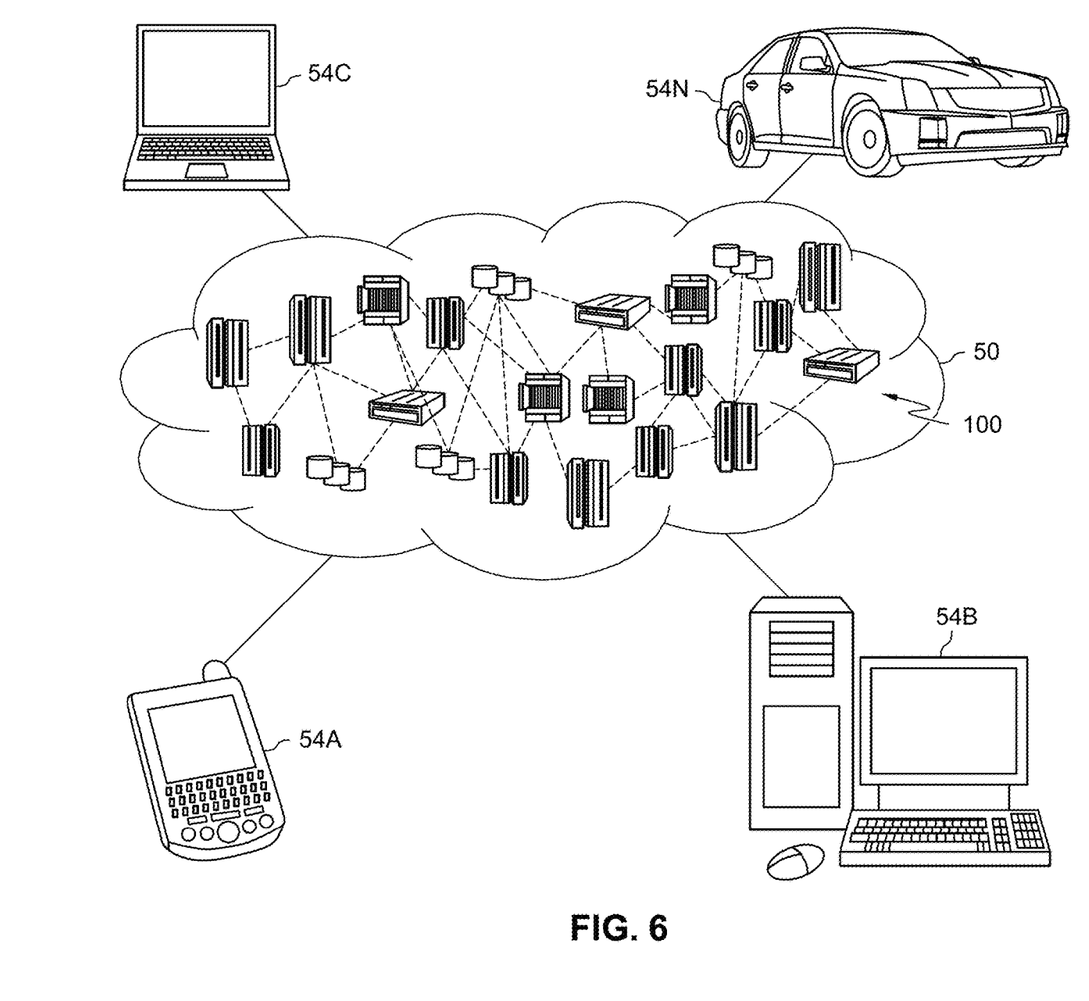
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
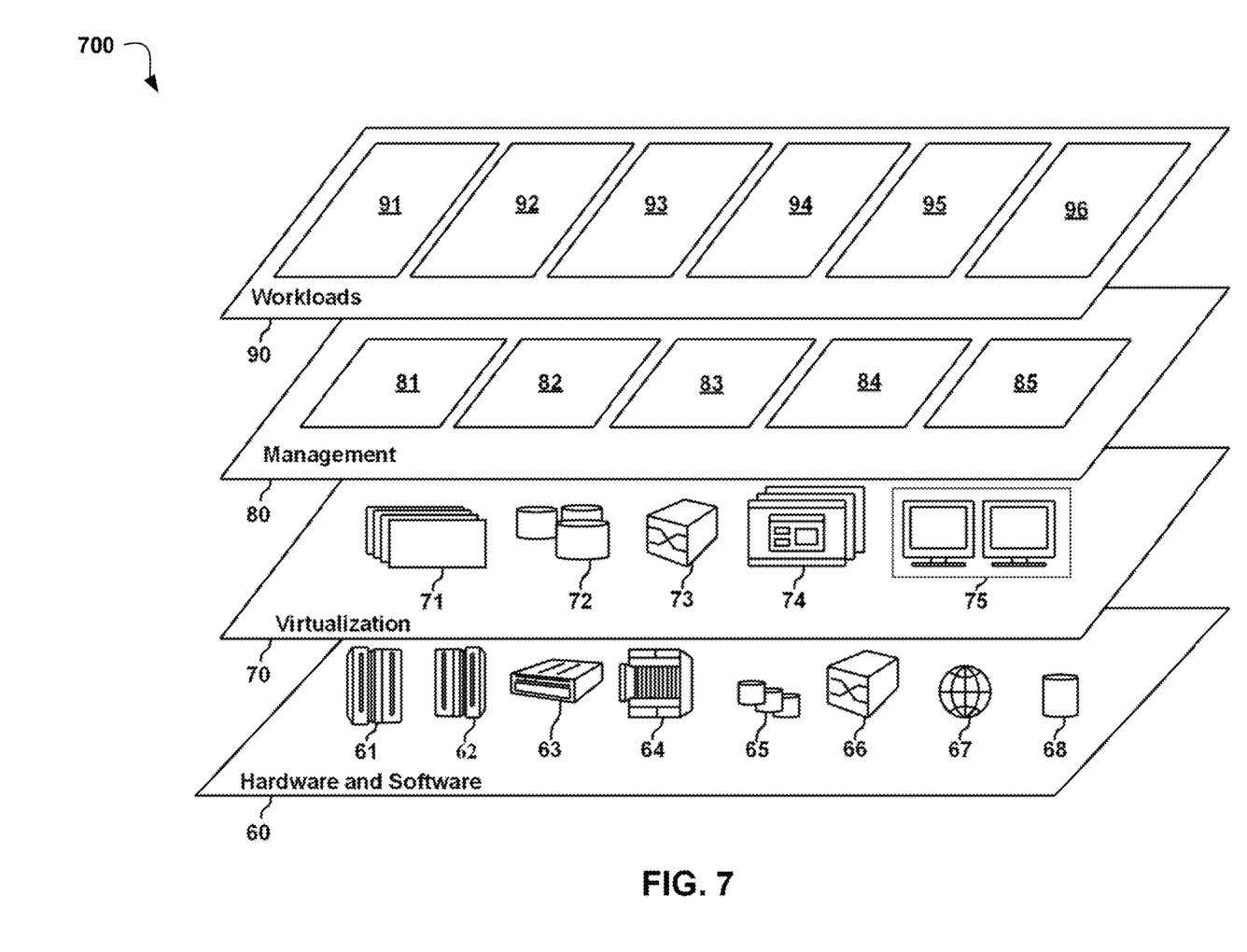
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and linked vehicle powertrain management 96. Linked vehicle powertrain management 96 may relate to identifying optimal locations for detachment and reattachment of powertrain devices to one or more vehicles of a linked vehicle based on various parameters and enabling the detachment and reattachment of the powertrain devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for detachable powertrain control, the method comprising:
coupling a plurality of vehicles into a linked vehicle, wherein each vehicle of the plurality of vehicles has a powertrain device with an attachment device, wherein the attachment device is configured to detach the powertrain device from one of the plurality of vehicles; and
based on determining that a weight of the linked vehicle should be reduced, causing the attachment device to detach the powertrain device from at least one of the plurality of vehicles, wherein causing the attachment device to detach the powertrain device includes:
controlling a remote controlled vehicle to relocate to a geolocation of the powertrain device; and
lowering, by the attachment device, the powertrain device from underneath the at least one of the plurality of vehicles onto the remote controlled vehicle.

2. The method of claim 1, wherein the weight of the linked vehicle is determined by a weight sensor of the powertrain device.

3. The method of claim 1, further comprising:
analyzing a route of the linked vehicle to determine a detachment location before a decoupling of at least one of the plurality of vehicles from the linked vehicle.

4. The method of claim 3, further comprising:
based on determining the linked vehicle reached the detachment location of at least one vehicle within the plurality of vehicles without an attached powertrain device, causing the attachment device to attach the powertrain device to the at least one vehicle.

5. The method of claim 1, further comprising:
identifying the plurality of vehicles to be coupled in the linked vehicle based on analyzing historical route data of the plurality of vehicles using K means clustering algorithm.

6. The method of claim 1, further comprising:
based on determining that the weight of the linked vehicle is above a threshold value, causing the attachment device to detach another powertrain device from at least one vehicle within the plurality of vehicles.

7. A computer system for detachable powertrain control, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
coupling a plurality of vehicles into a linked vehicle, wherein each vehicle of the plurality of vehicles has a powertrain device with an attachment device, wherein the attachment device is configured to detach the powertrain device from one of the plurality of vehicles; and
based on determining that a weight of the linked vehicle should be reduced, causing the attachment device to detach the powertrain device from at least one of the plurality of vehicles, wherein causing the attachment device to detach the powertrain device includes:
controlling a remote controlled vehicle to relocate to a geolocation of the powertrain device; and
lowering, by the attachment device, the powertrain device from underneath the at least one of the plurality of vehicles onto the remote controlled vehicle.

8. The computer system of claim 7, wherein the weight of the linked vehicle is determined by a weight sensor of the powertrain device.

9. The computer system of claim 7, further comprising:
analyzing a route of the linked vehicle to determine a detachment location before decoupling of at least one of the plurality of vehicles from the linked vehicle.

10. The computer system of claim 9, further comprising:
based on determining the linked vehicle reached the detachment location of at least one vehicle within the plurality of vehicles without an attached powertrain device, causing the attachment device to attach the powertrain device to the at least one vehicle.

11. The computer system of claim 7, further comprising:
identifying the plurality of vehicles to be coupled in the linked vehicle based on analyzing historical route data of the plurality of vehicles using K means clustering algorithm.

12. The computer system of claim 7, further comprising:
based on determining that the weight of the linked vehicle is above a threshold value, causing the attachment device to detach another powertrain device from at least one of the plurality of vehicles.

13. A computer program product for detachable powertrain control, the computer program product comprising:
one or more computer-readable tangible storage medium and program instructions stored on at least one of the one or more tangible storage medium, the program instructions executable by a processor, the program instructions comprising:
program instructions to couple a plurality of vehicles into a linked vehicle, wherein each vehicle of the plurality of vehicles has a detachable powertrain device with an attachment device, wherein the attachment device is configured to detach the powertrain device from one of the plurality of vehicles; and
based on determining that a weight of the linked vehicle should be reduced, program instructions to cause the attachment device to detach the powertrain device from at least one of the plurality of vehicles, wherein the program instructions to cause the attachment device to detach the powertrain device includes:
program instructions to control a remote controlled vehicle to relocate to a geolocation of the powertrain device; and
program instructions to lower, by the attachment device, the powertrain device from underneath the at least one of the plurality of vehicles onto the remote controlled vehicle.

14. The computer program product of claim 13, wherein the weight of the linked vehicle is determined by a weight sensor of the powertrain device.

15. The computer program product of claim 13, further comprising:
program instructions to analyze a route of the linked vehicle to determine a detachment location before decoupling of at least one of the plurality of vehicles from the linked vehicle.

16. The computer program product of claim 15, further comprising:

based on determining the linked vehicle reached the detachment location of at least one vehicle within the plurality of vehicles without an attached powertrain device, program instructions to cause the attachment device to attach the powertrain device to the at least one vehicle.

17. The computer program product of claim 13, further comprising:
program instructions to identify the plurality of vehicles to be coupled in the linked vehicle based on analyzing historical route data of the plurality of vehicles using K means clustering algorithm.

* * * * *